United States Patent
Hakomori

(10) Patent No.: US 6,370,402 B1
(45) Date of Patent: *Apr. 9, 2002

(54) PORTABLE RADIO TERMINAL

(75) Inventor: Tomoko Hakomori, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/500,770

(22) Filed: Feb. 8, 2000

(30) Foreign Application Priority Data

Feb. 19, 1999 (JP) ............................................ 11-041920

(51) Int. Cl.⁷ ................................................ H04B 1/36
(52) U.S. Cl. ....................................... 455/575; 455/550
(58) Field of Search ................................. 455/550, 551, 455/557, 462, 463, 465, 418, 410, 411, 574, 343

(56) References Cited

U.S. PATENT DOCUMENTS

| | | | | |
|---|---|---|---|---|
| 4,860,005 A | * | 8/1989 | DEluca et al. | 340/825 |
| 5,646,604 A | * | 7/1997 | Maruyama et al. | 340/825 |
| 5,719,523 A | * | 2/1998 | Reynolde | 455/89 |
| 5,862,472 A | * | 1/1999 | Park | 455/411 |
| 6,064,627 A | * | 5/2000 | Sakurai | 365/233 |

FOREIGN PATENT DOCUMENTS

JP 8-314805 11/1996 ............ G06F/12/14

* cited by examiner

Primary Examiner—Thanh Cong Le
Assistant Examiner—Khawar Iqbal
(74) Attorney, Agent, or Firm—Michael Best Friedrich LLC; J. Warren Whitesel

(57) ABSTRACT

The present invention provides a portable radio terminal comprising an off-memory 5-a in which a power-off time is stored, an on-memory 5-b in which a power-on time is stored, a difference memory 5-c in which a difference between the power-off time and the power-on is stored, a user data registration memory 4, and a portable terminal control unit 3, wherein, when a value stored in the difference memory 5-c reaches a predetermined time, the portable terminal control unit 3 waits for a password to be entered and, in response to the password entered, erases contents of the user data registration memory.

8 Claims, 4 Drawing Sheets

PORTABLE RADIO TERMINAL

FIELD OF THE INVENTION

The present invention relates to a portable radio terminal (or generally, mobile telecommunication terminal), and more particularly to a portable radio terminal that prevents illegal use even if the terminal is lost or stolen and, in addition, allows a user to start using it immediately after the terminal is returned to a user.

BACKGROUND OF THE INVENTION

Conventionally, there has been a need for preventing illegal use of a lost or stolen portable terminal. For example, Japanese Patent Kokai Publication JP-A-8-314805 ("Illegal-use prevention system and method for a portable radio terminal") discloses a technology for ensuring security as shown in FIG. 4. The technology disclosed in the above publication is that, if the user enters an invalid password a predetermined number of times in order to start the operation of a portable radio terminal 11, a notification indicating an illegal use is sent automatically to an information center 13 that manages the portable radio terminal 11. Then, the portable radio terminal 11, responding to the notification, encrypts internal data and sends it to the information center 13 to cause the center to create a backup copy. After that, the portable radio terminal 11 deletes all the internal data. The internal data includes personal data such as a directory or schedules.

SUMMARY OF THE INVENTION

However, problems have been encountered in the course of investigations toward the present invention. Namely, the technology described above involves a lot of work because it works with the information center. In addition, because all the internal data is erased after a backup copy is created, the user cannot start using the terminal immediately after the lost terminal is returned to the user.

In view of the foregoing, it is an object of the present invention to provide a novel portable terminal allowing the user to register a security password. That is, it is an object of the present invention to provide a portable terminal which, when the user has the terminal lost or stolen at a destination or outside his home or office, reduces the danger of some other user stealing internal data, that is, user-registered data.

It is a further object of the present invention to provide a novel portable terminal which also allows the user to start using the portable terminal immediately after the user recovers it.

To solve the above problem, the present invention provides a portable radio terminal comprising an off-memory in which a power-off time is stored, an on-memory in which a power-on time is stored, a difference memory in which a difference between the power-off time and the power-on is stored, a user data registration memory, and a portable terminal control unit, wherein, when a value stored in the difference memory reaches a predetermined time, the portable terminal control unit waits for a password to be entered and, in response to the password entered, erases contents of the user data registration memory.

According to another aspect of the present invention, if the value stored in said difference memory is smaller than the predetermined time, said portable terminal control unit accepts a password up to a predetermined number of times and, if the number of times the password is entered exceeds said predetermined number of times, erases the contents of said user data registration memory.

The user registration data generally includes a password.

Further, for activating the automatic data erasing system, the portable terminal control unit turns on power after another predetermined time has elapsed after the power is turned off.

PREFERRED EMBODIMENTS OF THE INVENTION

Embodiments of the present invention will now be described more in detail with reference to the drawings.

Figure 1:
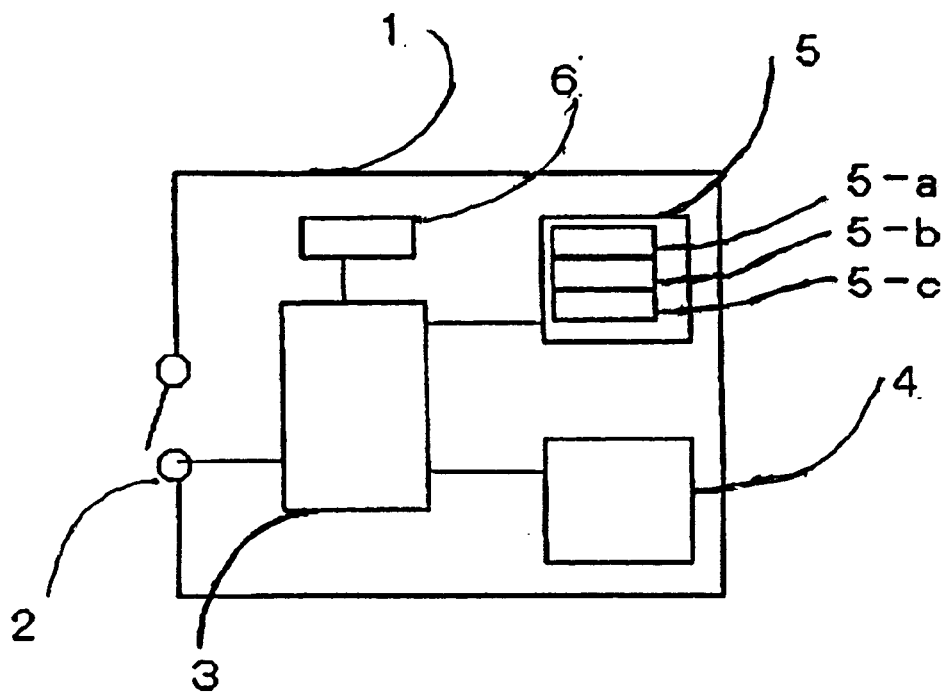
FIG. 1 is a block diagram showing a portable radio terminal according to present invention.

FIG. 1 is a block diagram showing a portable radio terminal according to present invention. As shown in FIG. 1, the portable radio terminal comprises a portable terminal control unit 3 and other components, which operate under control of portable terminal control unit 3, including a clock 6, a power switch 2, a user data registration memory 4, and a system memory 5. The system memory 5 includes an area 5-a in which the power-off time is stored, an area 5-b in which the power-on time is stored, and an area 5-c in which a difference between the power-on time and the power-off time is stored.

The user data stored in the user data registration memory 4 includes an owner's password, directory, schedule, and so on.

Figure 2:
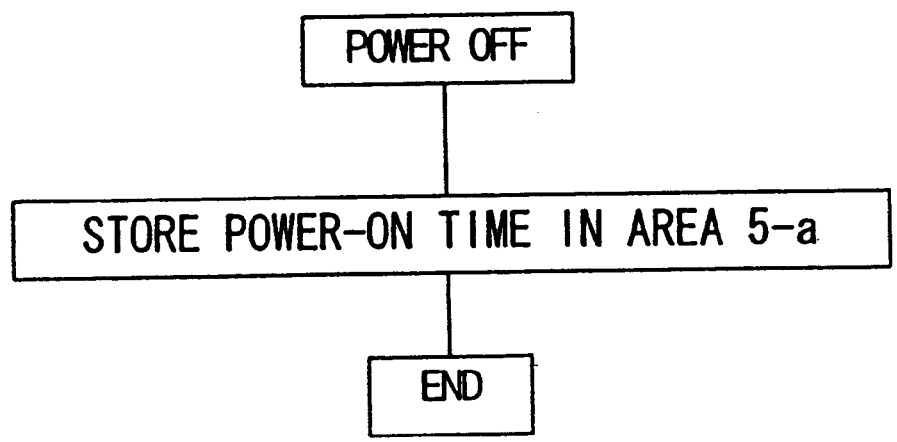
FIG. 2 is a flowchart showing the operation on a system memory performed by the portable radio terminal.

FIG. 2 is a flowchart showing the operation on the area 5-a of the system memory performed by the portable radio terminal. As shown in FIG. 2, the power-off time is stored in the area 5-a after power is turned off.

Figure 3:
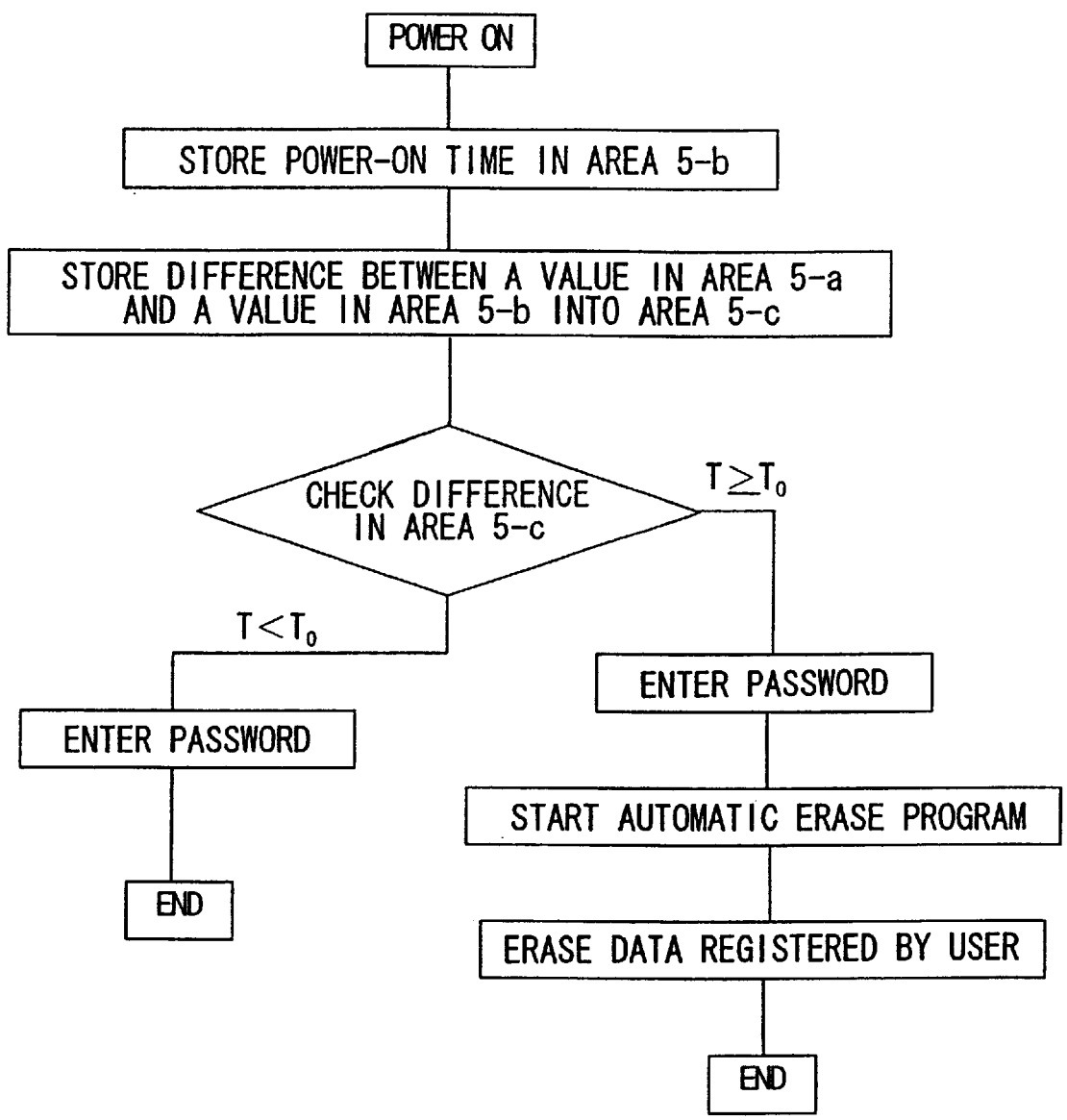
FIG. 3 is a flowchart showing an operation of the portable radio terminal according to present invention.

FIG. 3 is a flowchart showing an operation of the portable radio terminal according to one embodiment of the present invention. As shown in FIG. 3, when power is turned on after the terminal is left unused for a predetermined length of time, the power-on time is stored in the area 5-b. This predetermined length of time is set to a standard length of time, for example, 24 hours, during which the owner is expected to recover the lost terminal by reporting the loss after the loss.

The difference T between the value in the area 5-a and the value in the area 5-b is stored in the area 5-c.

The portable terminal control unit 3 compares the value stored in the area 5-c with a user-specified value $T_0$. If the value in the area 5-c is equal to or larger than $T_0$, the portable terminal control unit 3 waits for the user to enter a password (whatever it be) and, when it receives the password, erases the data stored in the user memory.

On the other hand, if T is smaller than $T_0$, the portable terminal control unit 3 assumes that normal password entry processing was performed.

Figure 4:
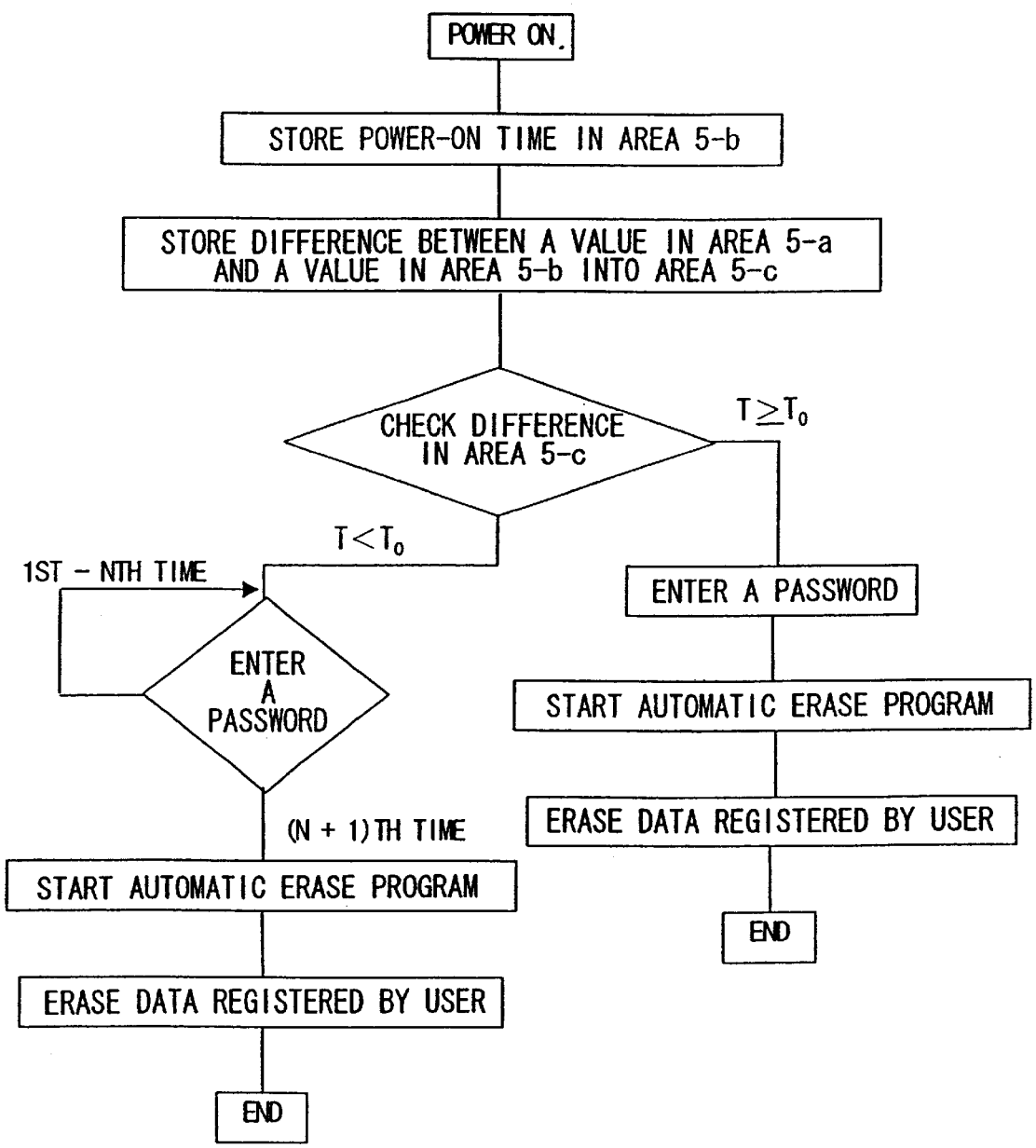
FIG. 4 is a flowchart showing an another operation of the portable radio terminal according to present invention.
Figure 5:
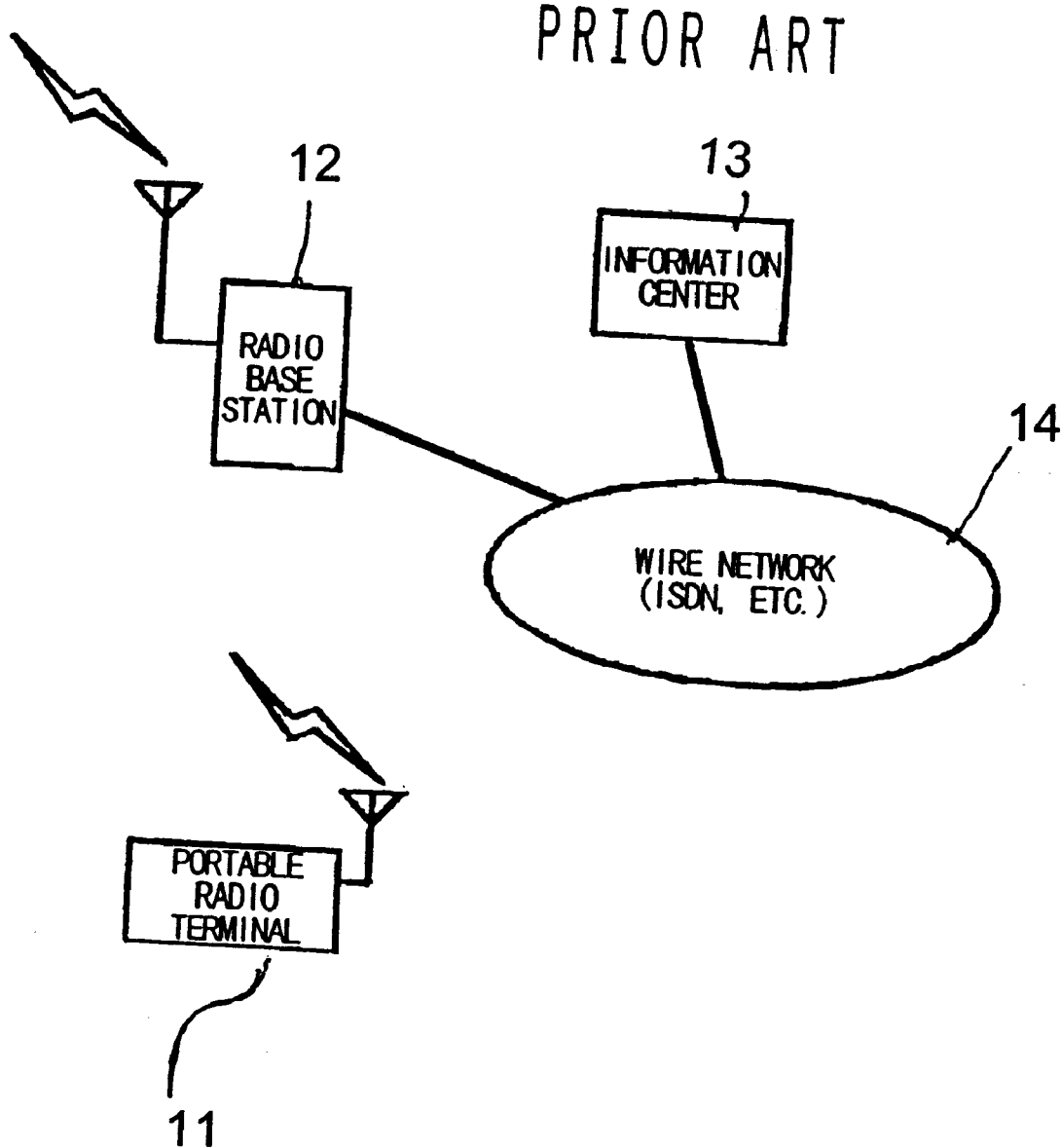
FIG. 5 is a block diagram showing a conventional illegal-use prevention system of a portable radio terminal.

FIG. 4 is a flowchart showing another embodiment of the present invention. As shown in FIG. 4, when power is turned on after the terminal is left unused for a predetermined length of time, the power-on time is stored in the area 5-*b*. The difference T between a value in the area 5-*a* and a value in the area 5-*b* is stored in the area 5-*c*.

The portable terminal control unit 3 compares the value T, stored in the area 5-*c* with a user-specified, predetermined value $T_0$. If T is equal to or larger than $T_0$, the portable terminal control unit 3 waits for the user to enter a password and, when it receives any password (whatever password, correct or incorrect), erases the data registered in the user memory. $T_0$ is set up considering factors such as a second period of time from the moment the terminal is lost or stolen and the remaining battery power in the terminal.

On the other hand, if the value stored in the area 5-*c* is smaller than $T_0$, the user is allowed (without erasure of the stored data) to enter a password until the predetermined number of times, N, is reached. This predetermined number of times may also be set to a user-desired value. This allows the possibility of contact with the lost or stolen terminal with the internal data stored in the terminal. Also the true user can again use the terminal recovered within the specified time limit $T_0$ without erasure (loss) of the stored personal information.

In addition, as shown in FIG. 4, even if the password is entered N+1 times, an automatic erase program is started to erase the data stored in the user memory regardless of whether or not the correct password is entered. Namely, the repeated entry of password is deemed as illegal use by a person other than the true, registered user because the true user need not repeat passwords so many times.

The meritorious effects of the present invention are summarized as follows.

As described above, the present invention provides a portable terminal generally allowing the user to register a security password. Even if the user has the terminal lost or stolen at a destination outside the user's home or office and some other user obtains it, this portable terminal reduces the danger that user-registered data is stolen and allows the user to start using the portable terminal immediately after the user recovers it.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A portable radio terminal comprising:

an off-memory in which a power-off time is stored, an on-memory in which a power-on time is stored, a difference memory in which a difference between said power-off time and said power-on is stored, a user data registration memory, and a portable terminal control unit, wherein, when a value stored in said difference memory reaches a predetermined time, said portable terminal control unit waits for a password to be entered and, in response to the password entered, erases contents of said user data registration memory.

2. The portable radio terminal as defined by claim 1 wherein said portable terminal control unit turns on said power after another predetermined time has elapsed after said power is turned off, thereby activating an automatic data erasing system for erasing the contents of said user data registration memory.

3. The portable radio terminal as defined by claim 1 wherein, if the value stored in said difference memory is smaller than the predetermined time, said portable terminal control unit accepts a password up to a predetermined number of times and, if the number of times the password is entered exceeds said predetermined number of times, erases the contents of said user data registration memory.

4. The portable radio terminal as defined by claim 1 wherein said user registration data includes the password.

5. A portable radio terminal comprising:

an off-memory in which a power-off time is stored, an on-memory in which a power-on time is stored, a difference memory in which a difference between said power-off time and said power-on is stored, a user data registration memory, and a portable terminal control unit, wherein if a value stored in said difference memory is equal to or larger than a predetermined time when power is turned on, said portable terminal control unit waits for a password to be entered and, in response to the password entered, erases contents of said user data registration memory.

6. The portable radio terminal as defined by claim 5 wherein said portable terminal control unit turns on said power after another predetermined time has elapsed after said power is turned off, thereby activating an automatic data erasing system for erasing the contents of said data registration memory.

7. The portable radio terminal as defined by claim 5 wherein, if the value stored in said difference memory is smaller than the predetermined time, said portable terminal control unit accepts a password up to a predetermined number of times and, if the number of times the password is entered exceeds said predetermined number of times, erases the contents of said user data registration memory.

8. The portable radio terminal as defined by claim 5 wherein said user registration data includes the password.

* * * * *